United States Patent [19]

Smith

[11] 4,040,504
[45] Aug. 9, 1977

[54] DRIVE SHAFT U-JOINT LUBRICATOR

[76] Inventor: Roy B. Smith, 3480 NE. 62, Washington Court House, Ohio 43160

[21] Appl. No.: 635,439

[22] Filed: Nov. 26, 1975

[51] Int. Cl.² ............................................. F01M 9/00
[52] U.S. Cl. .............................................. 184/1 E; 64/23
[58] Field of Search .................. 184/6, 26, 32, 1 E, 184/6.28; 64/17 A, 32 F, 23

[56] References Cited

U.S. PATENT DOCUMENTS

| 3,006,168 | 10/1961 | Kayser | 184/6 |
| 3,123,990 | 3/1964 | Freeman | 64/32 F |
| 3,326,323 | 6/1967 | Delker | 184/6 |
| 3,785,460 | 1/1974 | Smith | 64/17 A |
| 3,805,553 | 4/1974 | Yehl | 184/6 |
| 3,901,049 | 8/1975 | Herscovici | 64/17 A |

Primary Examiner—Samuel Feinberg
Attorney, Agent, or Firm—Sidney W. Millard

[57] ABSTRACT

An annular lubrication reservoir is mounted on the periphery of a rotatable shaft, the reservoir defining a fluid tight annular enclosure having one or more apertures through its outermost surface. Conduit means are connected to the aperture for conducting lubrication from the reservoir to a bearing surface. Valve means are mounted in the aperture to limit the lubricant flow to one direction, out of the reservoir toward the bearing surface. A piston pump is mounted in association with the apertures whereby on rotation of the shaft the piston is driven radially outward to force lubricant out of the reservoir through the valve and into the conduit.

1 Claim, 3 Drawing Figures

DRIVE SHAFT U-JOINT LUBRICATOR

BACKGROUND OF THE INVENTION

Automatic lubrication means for universal joints are not new. Representative of the prior art are the patents to Kayser, U.S. Pat. No. 3,006,168, dated Oct. 31, 1961 and Delker, U.S. Pat. No. 3,326,323, dated June 20, 1967. These inventions both require specially constructed drive shafts with lubricant reservoirs in the drive shaft itself.

Each company manufacturing trucks and commercial vehicles designs its own drive shaft along with body style and all other facets of the vehicle. Thus, drive shafts are not standard as to length or diameter and to have an automatic lubrication system according to the prior art, one would have to have enumerable sizes and lengths of drive shaft especially constructed to replace existing equipment. As will be clear to those in the commercial vehicle industry, the replacement and labor costs are prohibitive.

What is needed is an independently mountable lubrication system which is universally applicable to the drive shafts of all commercial vehicles. The invention described herein is just such a device.

Heretofore, it was recognized that a great deal of difficulty is encountered in trying to lubricate a rotating joint, in that, the conduits conducting the lubricant must rotate simultaneously with the joint or else the lubrication can be achieved only during the times of complete stoppage of the joint. Hand operated lubrication by a grease gun is common.

SUMMARY OF THE INVENTION

This invention provides for a symmetrically balanced reservoir to be mounted on the periphery of any existing draft shaft on a commercial vehicle. It is held in place on the shaft by a plurality of set screws projecting through hubs on each side of the reservoir.

Lubrication is delivered from the reservoir through apertures in the radially outermost portion of the reservoir. Conduits connected to the apertures deliver the lubricant to various bearing surfaces distributed from one end of the drive shaft to the other. The lubrication apparatus herein described is limited to delivery of lubricant to openings rigidly connected to the shaft, it being clear that the conduits rotate with the shaft.

Valving means are provided in the apertures of the reservoir to prevent backflow of the lubricant into the reservoir after the lubricant is delivered to the conduit. The valving means comprises an O-ring in tension, resting in and sealing against both sides of a groove. Lubricant in the reservoir is in fluid communication with the innermost portion of the groove and pressure applied to the lubricant in the innermost portion of the groove overcomes the tension in the O-ring forcing it partially out of the groove and allowing lubricant under pressure to escape into the conduit.

A chamber or cylinder is mounted in the aperture with one end being in communication with the innermost portion of the groove and the other end being normally in fluid communication with the inside of the reservoir by virtue of openings through the side wall of the chamber. A piston is mounted in the chamber and designed to reciprocate in the chamber with the piston being biased radially inward toward the shaft and in its innermost position leaving the side opening into the chamber open to the lubricant in the reservoir. A weight or mass is attached to the piston whereby, on rotation of the shaft the mass of the piston and its attached weight overcomes the biasing means and drives the piston radially outwardly into the cylinder and in its movement the piston seals the openings in the side wall of the chamber and thereby places the lubricant in the cylinder under pressure. Said pressure is transmitted through the lubricant into the groove with resultant expansion of the O-ring and escape of the lubricant as it is driven into the conduit by the radially outward pressure exerted by the piston. Only one charge of lubricant will be delivered to the conduit each time the shaft begins rotation. For example, assuming the shaft is a drive shaft in a commercial vehicle, the piston will charge one unit of lubricant every time the motor is started. Another charge will not be delivered until the drive shaft stops, the piston retracts and the shaft restarted.

Objects of the invention will be clear from the following detailed description of the preferred embodiments.

DESCRIPTION OF THE PREFERRED EMBODIMENTS

Figure 1:
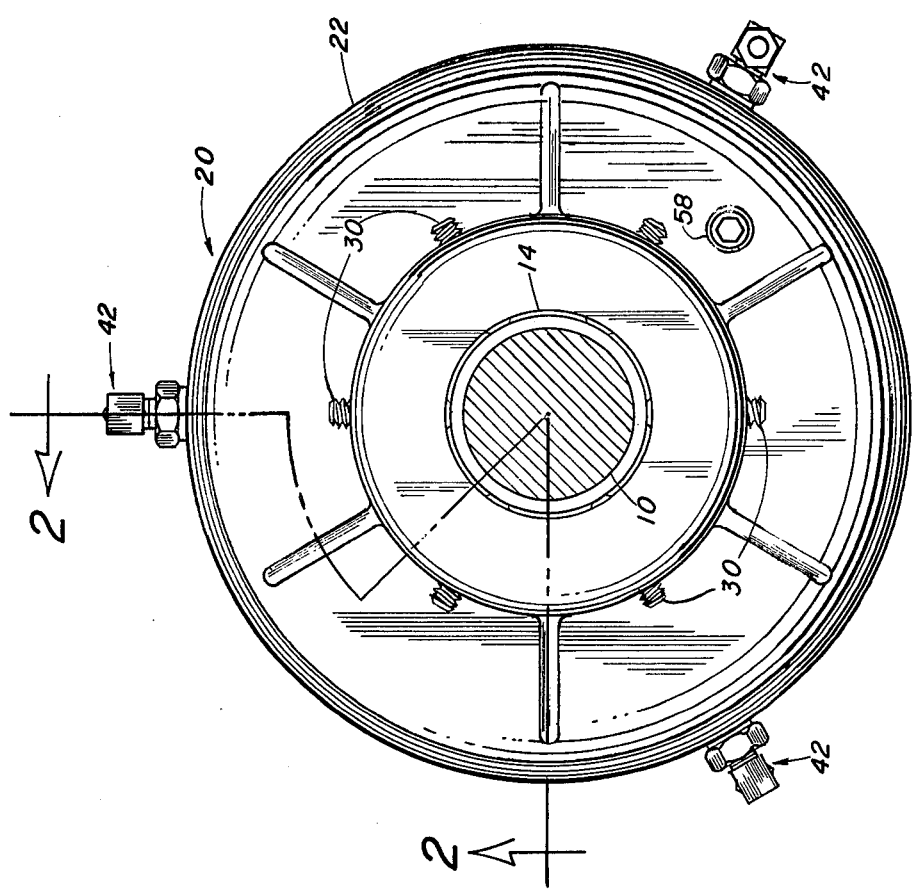
FIG. 1 is an end elevational view of the reservoir of this invention mounted on a shaft.
Figure 2:
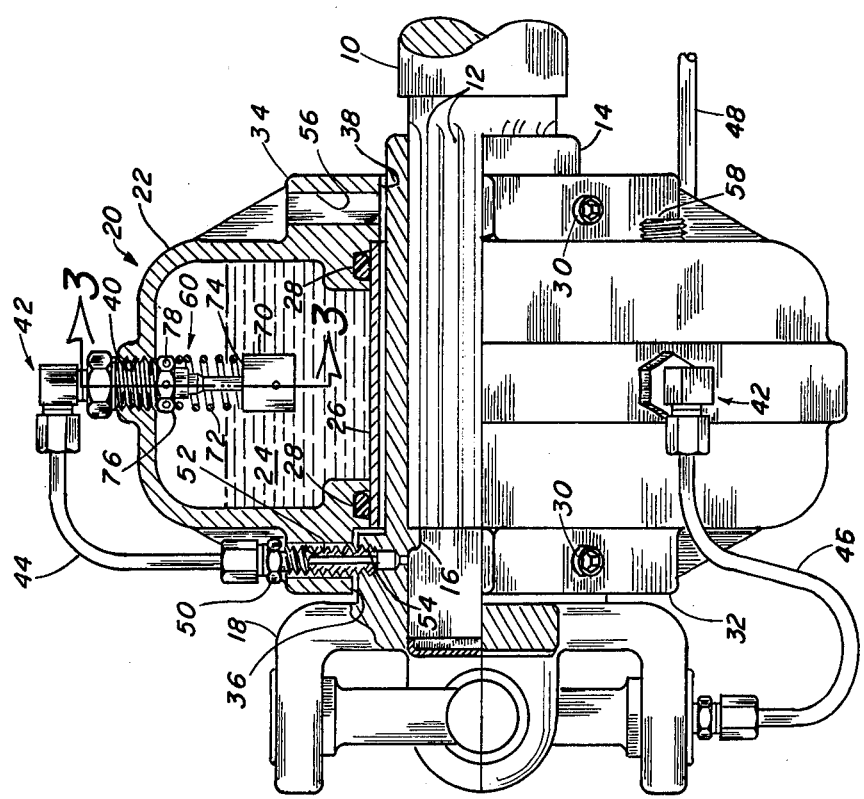
FIG. 2 is a side elevational view of the reservoir of FIG. 1 partially in section taken along line 2—2.

A conventional shaft 10 is illustrated in FIGS. 1 and 2 having mounting grooves 12 at its end. A sleeve 14 having inwardly projecting ribs 16 which slide into the grooves 12 is mounted concentrically on the shaft 10 to support a conventional yoke 18 which makes up part of a conventional universal joint. Universal joints in commercial vehicles must be lubricated periodically and apparatus for such automatic lubrication illustrated generally at 20 is designed to be mounted concentrically with the shaft 10 and sleeve 14.

The apparatus 20 includes a reservoir 22 comprising a hollow casting designed to hold about 5 pints of lubricant 24. The radially inner portion of the cavity of the casting 22 is defined by a sleeve 26. Elastomeric seals 28 are mounted in grooves machined into the inner surface of the casting and serve the purpose of preventing the escape of lubricant 24 between the casting and sleeve 26.

The reservoir 22 is mounted on sleeve 14 by set screws 30 which extend through threaded openings in hubs 32 and 34 projecting axially from each end of the casting.

It will be observed that hub 32, nearest the yoke 18, has a cylindrical inside surface 36 which is greater in diameter than the inside surface 38 of hub 34. The surfaces 36 and 38 are designed to be $3\frac{3}{4}$ inches and $3\frac{1}{4}$ inches (approximately 9.53 and 8.25 centimeters) respectively so they will easily slide over the range of conventional sizes of sleeves and drive shafts. That is, the illustrated reservoir is designed to operate and be mounted on a wide variety of shaft sizes without any modification of the shaft.

As will be clear from an observation of the structure illustrated, the housing reservoir 22 is reversable in that with larger sizes of sleeves 14, the larger inside diameter of hub 36 is mounted adjacent the yoke 18. Should the sleeve 14 be of smaller size the casting 22 would be reversed with the smaller sized diameter inside hub 34 being mounted nearest the yoke. The set screws 30 nearest the yoke are to hold the reservoir rigidly in place and the set screws remote from the yoke are for balance and maintaining the reservoir generally concentrically mounted around the shaft 10 to prevent vibration upon rotation.

Threaded apertures 40 are provided which extend through the radially outermost portion of the reservoir 22 and appropriate fittings indicated generally at 42 are mounted in the aperture 40 to connect various conduits 44, 46, and 48 in fluid communication with the inside of the reservoir. The conduits are designed to conduct lubricant from inside the reservoir to some remote bearing surface or cavity in need of lubrication. For example, conduit 44 is attached to a fitting 50 which projects through a smooth opening 52 in hub 32 and threads into an opening 54 in the sleeve 14.

It will be observed that an opening 56 through hub 34 is designed to receive a similar fitting 50 should the reservoir be reversed as described above. It will also be observed that the two smooth openings 52 and 56 are aligned and diagonally opposite a plug 58 threaded into the fill aperture of the reservoir. The mass of the casting removed to form openings 52 and 56, the fitting 50 inserted, the plug 58 and their distances from the center of rotation or axis of the shaft are closely corrolated such that equilibrium balance is achieved to prevent vibration during the conventional rotation of the drive shaft. It is important that such vibration not occur for the obvious mechanical reasons, but during the course of the design and experimentation of this invention it was discovered that the lubricant being of thixotropic composition generally, although occasionally of a lower viscosity similar to conventional motor oil, assists in the rotational balance of the structure. That is, the lubricant mass shifts to positions within the reservoir cavity which tend to balance the apparatus 20 overall in its high speed rotation with the drive shaft 10. This interesting equilibrium balance achieved by the lubrication helps to overcome small imbalances which are inherent, but it is limited in how much equilibrium balance it can achieve and care must be taken in the casting and machining of the apparatus to try to insure as much balance as possible.

Figure 3:
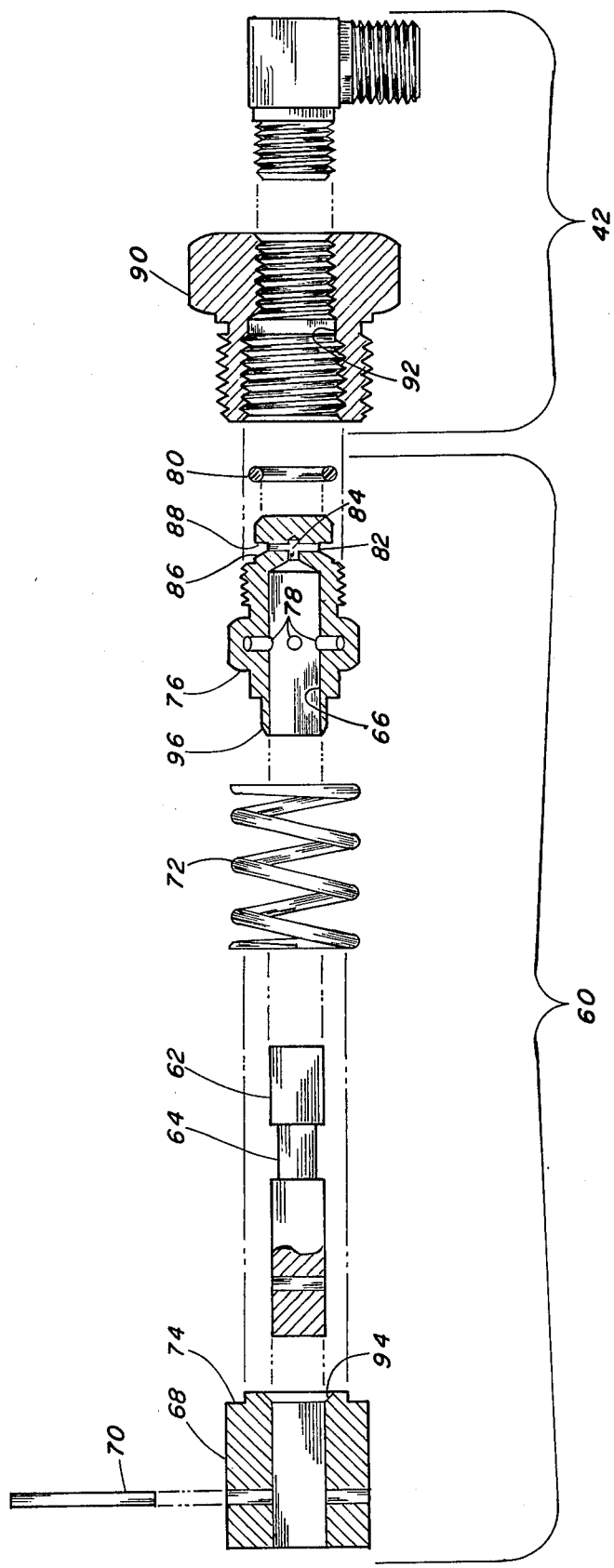
FIG. 3 is an exploded sectional view of the valving and lubricant charging apparatus of FIG. 2 taken along line 3—3.

Piston pumps indicated generally at 60 and illustrated in exploded view in FIG. 3 are threadedly connected to fittings 42 to mount the pump generally in the aperture 40. One piston pump will be mounted in each aperture as will be explained in more detail subsequently.

A piston 62 on one end of a shaft 64 is designed to reciprocate in a chamber or cylinder 66. On the opposite end of shaft 64 is mounted a weighted mass 68 which is attached to the shaft 64 by a conventional pin connection 70.

Spring biasing means 72 acting against shoulders 74 and 76 on the mass and cylinder, respectively, bias the piston 62 to its radially innermost position. The piston is prevented from leaving the cylinder 66 by virtue of the method of assembly of the apparatus which will be explained in more detail subsequently.

At its radially innermost position the piston 62 is disposed radially inward of the openings 78 which project radially through the side wall of the chamber 66 to allow lubricant to enter the chamber during the rotation of the drive shaft 10.

Valving means is provided by circular O-ring 80 mounted in the groove 82. It will be observed that the groove 82 is in fluid communication with the inside of chamber 62 by virtue of passage 84 and that the groove is defined by two sides 86 and 88. The radially innermost side 86 slopes such that the groove 82 converges inwardly. The radially outermost side defines a plane perpendicular to a line extending radially from the axis of the shaft 10 through the center of the circular elastomeric O-ring 80. It is important that the surface 88 be flat to prevent the camming outwardly of the O-ring 80 on high speed rotation of the shaft 10. Should the surface 88 be sloping, upon high speed rotation of the shaft lubricant discharged initially into the conduit 44 might feed back under back pressure into the chamber 66; however, with the surface 88 flat the O-ring 80 is not cammed out of sealing position and accordingly, the back pressure will tend to more firmly seat the O-ring against the two surfaces 86 and 88 to prevent backflow of lubricant.

In operation in initial assembly, the O-ring 80 is expanded and slipped into place in the groove 82. The diameter of the O-ring and the spacing of the walls 86 and 88 are such that the O-ring 80 is in tension when it is in contact with surfaces 86 and 88 such that, the O-ring acts as a sealing valve type arrangement preventing fluid flow in any direction unless overcome by pressure from the inside of groove 82. Next the means forming the chamber 66 is threaded into the fitting 90 such that the O-ring will be aligned with a smooth cylindrical surface 92 which is large enough to allow slight expansion of O-ring 80 but prevents the O-ring from being dislodged from the groove 82.

The mass 68 is attached to the piston 62 by pin 70, the spring 72 is mounted between the surfaces 74 and 76 and the piston 62 inserted into the cylinder 66. Then the spring 72 is compressed so that the piston is pushed to its radially outermost position such that the sloping surfaces 94 and 96 on the mass and chamber, respectively, are in contact. Surface 94 is at a 45° angle and surface 96 is at a 60° angle. With the surfaces 94 and 96 in contact a light blow by means such as a light hammer is applied to the mass 68 which crimps the surface 96 slightly inward and thereby prevents the removal of the piston 62 from the cylinder 66.

To mount the apparatus 20 in operable position, the yoke 18 will be disengaged from the remainder of the U-joint and dropped down so the sleeve 12 can be removed from the shaft 10. The apparatus 20 is then slid into place over the shaft, the sleeve remounted and the yoke reattached. The set screws 30 may be tightened into operative position either before or after the yoke 18 is attached to form the U-joint. Similar comments are applicable to fitting 50.

Thereafter, the conduits 44, 46, and 48 are mounted in operative position. As illustrated, conduit 44 is designed to lubricate the end of shaft 10, conduit 46 is designed to lubricate the bearings of the universal joint and conduit 48 is designed to lubricate some bearing surface at the opposite end of shaft 10. Obviously, the conduits must rotate with the drive shaft and whatever surface is lubricated must also rotate with or be in direct contact with, the shaft or its attachments.

As the shaft begins to rotate the lubricant 24 will be propelled radially outward by centrifugal force and will lie in the reservoir 22 in a ring against the outer surface of the reservoir. This will force the lubricant into the chamber 66 through openings 78. As greater speed is achieved in the rotation, the mass 70 and piston 62 will be propelled by centrifugal force radially outward and as they overcome the spring bias 72 the piston will move radially outward to cover the openings 78 and thereby trap a full chamber of lubricant. Increased pressure exerted on the lubricant by the piston will be transmitted through the lubricant to the inside surface of the elastomeric O-ring 80 and the O-ring will expand outwardly allowing the lubricant under pressure to escape along the sides of the groove such that it will flow outward through fittings 42 and conduits 44, 46, and 48. The volume of the chamber can be adjusted as needed but a similarly operating piston pump 60 will be mounted in each aperture 40 in the radially outer wall of the reservoir.

Only one charge of lubricant will be delivered to each conduit with each starting of the motor of the commercial vehicle involved. The piston will remain in its radially outer position until such time as the shaft comes to rest and the spring bias 72 forces the piston back to its radially innermost position. Restarting the motor and rotation of the drive shaft begins the sequence again.

Having thus described the invention in its preferred embodiment, it will be obvious to those having ordinary skill in the art that certain modifications could be made to the structure described herein without departing from the spirit of the invention. It is not the intention of the inventor to be limited by the language used to describe the invention nor the drawings illustrating the preferred embodiment, rather it is the intention of the inventor to be limited only by the scope of the appended claims.

I claim:

1. A method of mounting lubricating apparatus on the drive shaft of a previously assembled commercial vehicle, said drive shaft having an end with longitudinally extending splines on the periphery, said splines extending only part of the length of the shaft, a yoke mounted on the shaft and having mating internal splines, said yoke comprising part of a universal joint; comprising in sequence, first disconnecting said universal joint and removing the yoke from the shaft, second sliding an annular dynamically balanced lubricant reservoir over the shaft past the splines, third reattaching the yoke and shaft in operable position with the splines again mating, fourth rigidly attaching said reservoir to said shaft and yoke combination, and fifth attaching conduits to said yoke and reservoir to conduit lubricant from said reservoir to said yoke, providing means within said reservoir prior to its assembly on the shaft to force lubricant from said reservoir into said conduits upon rotation of said shaft.

* * * * *